Nov. 19, 1968 L. R. KEYSER 3,411,544
REINFORCED CONCRETE PIPE
Filed June 28, 1966 2 Sheets-Sheet 1
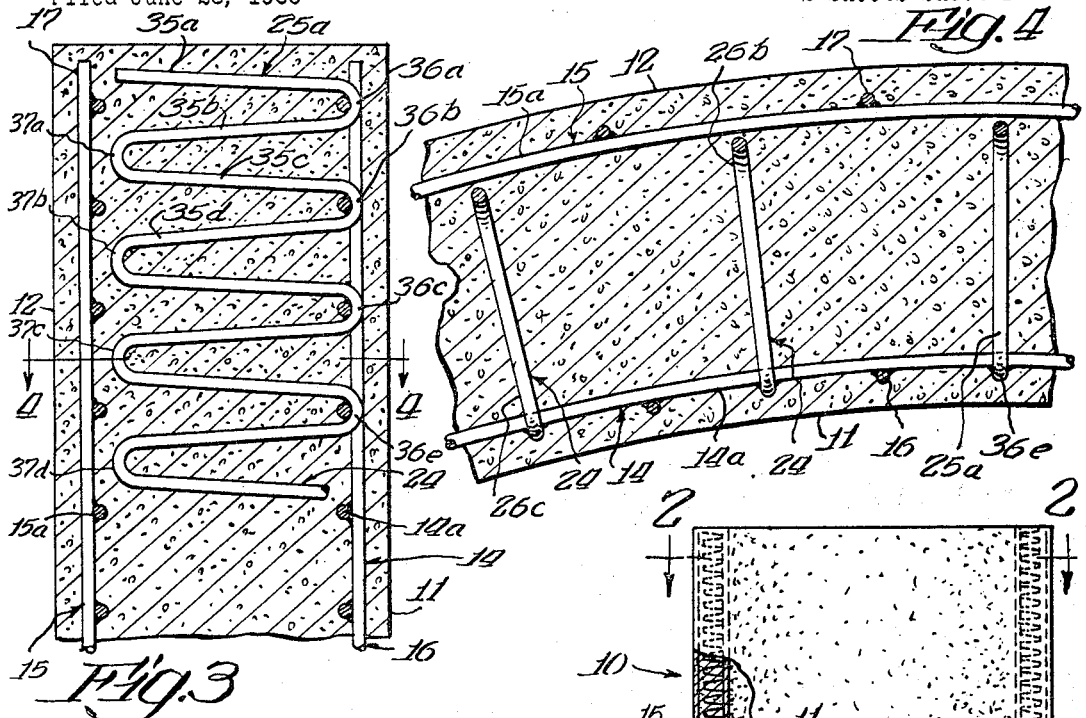
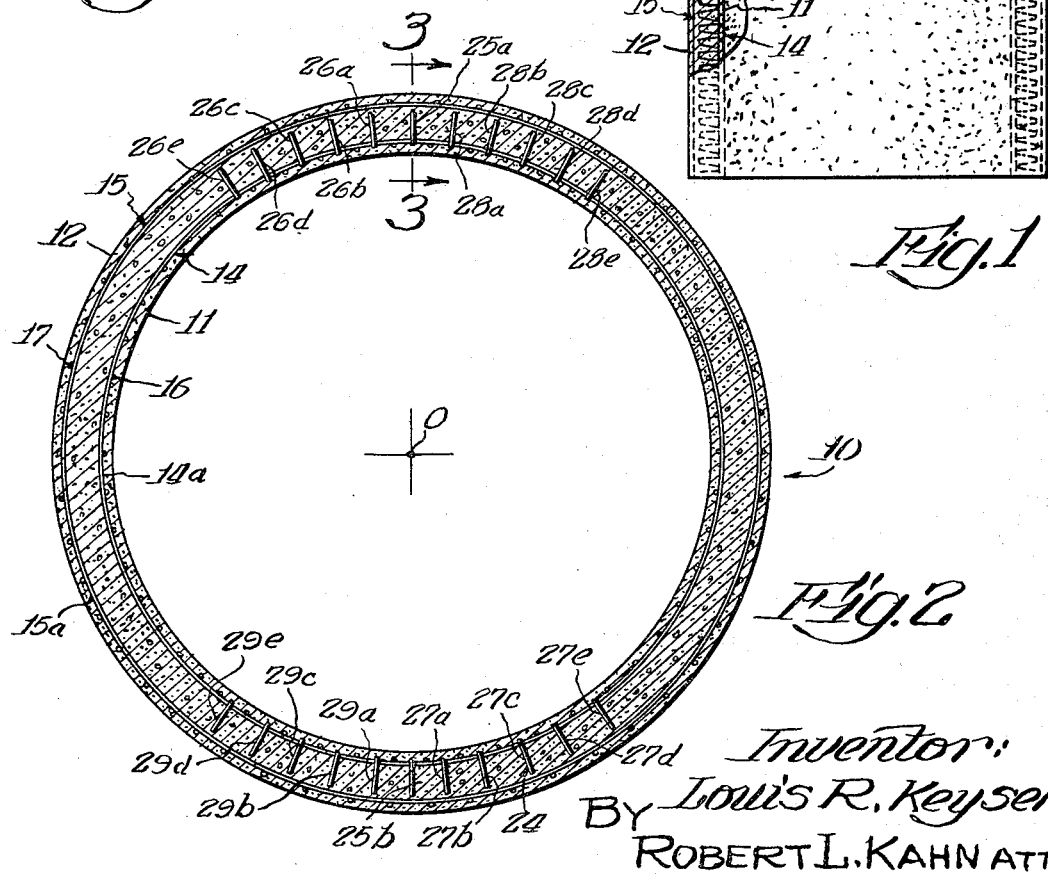
Inventor:
Louis R. Keyser
BY Robert L. Kahn ATTY.

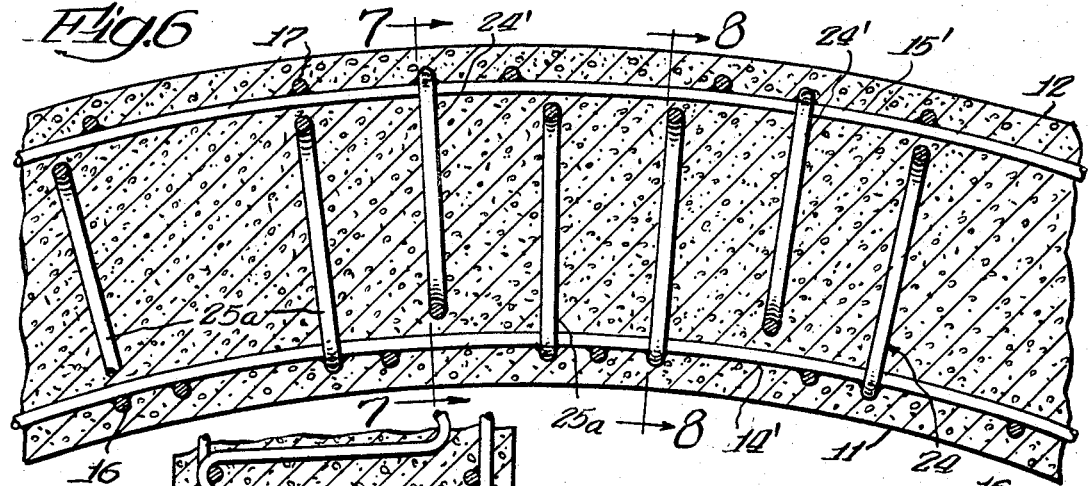
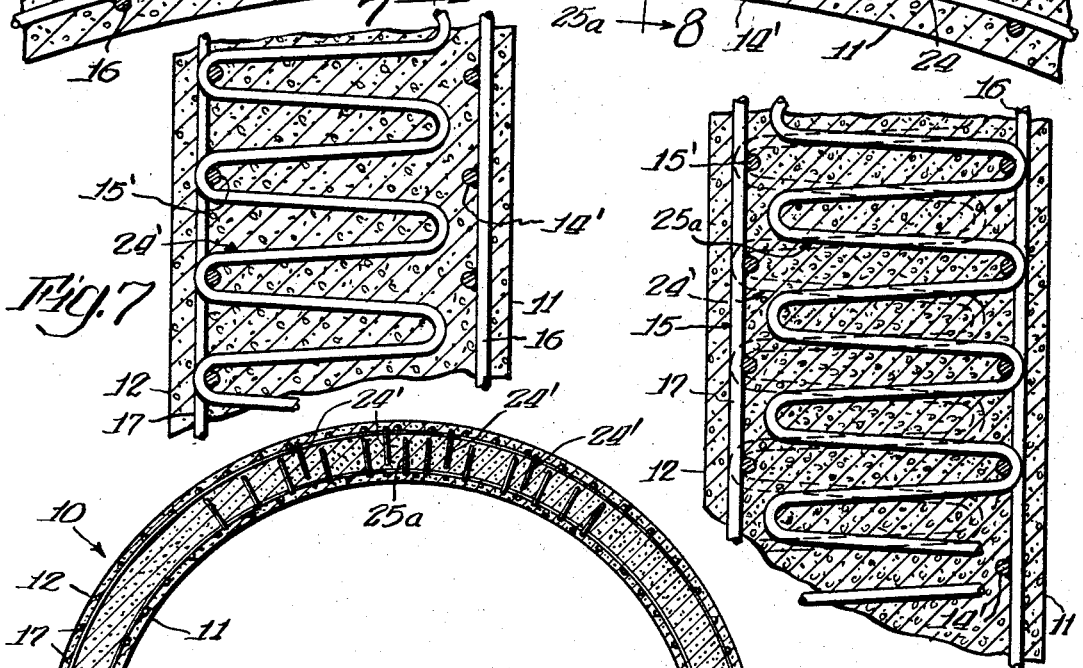
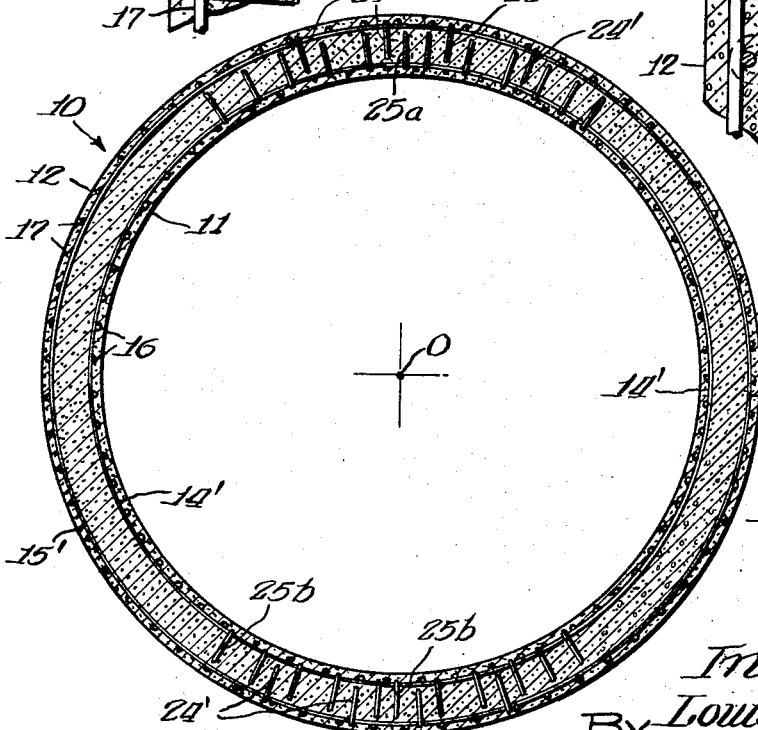

3,411,544
REINFORCED CONCRETE PIPE
Lewis R. Keyser, Dayton, Ohio, assignor to Price Brothers Company, Dayton, Ohio, a corporation of Michigan
Filed June 28, 1966, Ser. No. 561,272
5 Claims. (Cl. 138—175)

ABSTRACT OF THE DISCLOSURE

Large diameter concrete pipe has two concentric cylindrical inner and outer steel cages disposed within the pipe wall near the inner and outer pipe surfaces. Sinuous steel stirrups extend along the pipe length, each stirrup being rigidly anchored to the inner cage and extending radially toward but short of the outer cage. The regions of such stirrup reinforcement, as seen in transverse pipe section, subtend substantially equal angles of between about 60° and 70° at the crown and invert, symmetrically to the vertical plane between crown and invert.

---

This invention relates to reinforced concrete pipe and, more particularly, to large diameter concrete pipe ranging in size up from about 48" diameter and particularly 120"–144" in diameter. The pipe embodying the present invention is provided with steel reinforcement for the purpose of resisting external loading (trench loading) but otherwise is not adapted for handling fluids under pressure. Pipes for handling the latter are generally designated as pressure pipe and are pre-stressed with tensioned steel reinforcement. The pipe embodying the present invention does not have any pre-stressing and is generally used for sewer and culvert purposes.

Pipe to which the present invention relates is usually buried in the ground and is subject to external loads. Such pipe, particularly in larger sizes, has normally untensioned steel cage reinforcement. As a rule, when two concentric steel cages are used, the inner and outer cages are disposed within the concrete generally within about 1" to 1½" from the inner and outer pipe surfaces respectively. A concrete pipe having such concentric cages will generally have a wall thickness ranging from about 5" to as much as 12" or more.

A pipe as disclosed above when buried in ground has to withstand not only its own weight but also that of ground material above the pipe and withstand pressure peaks resulting from road or street traffic. Such a pipe under load without benefit of any internal liquid pressure must resist a force tending to deform the pipe into the general shape of an ellipse whose major axis (spring line) is horizontal and whose minor axis (between crown and invert) is vertical. A stress analysis of such a pipe under load indicates (and this is borne out by experiment) that certain cage portions are tensioned and consequently result in the arcuate steel rod tending to straighten. The reaction of the concrete medium containing the tensioned curved steel results in tension in the concrete.

As is well known, concrete is weak in tension. Specifically, a pipe having concentric cages has the inside cage stell under tension at the crown and invert (top and bottom respectively of the pipe) while the outside cage is under tension at the spring line. Since the inside cage coils (as well as the outside cage coils) are curved with respect to the pipe axis, the tensioned steel tends to straighten. The concrete between the two cages is the only part of the pipe where any force for resisting this straightening may be present. At the crown and invert of a pipe, the flattening of the pipe under load creates generally radial cracks in the concrete pipe wall extending from the inside pipe surface toward the outer pipe surface. Similarly tension in the outer cage coils at the spring line creates generally radial cracks in the concrete pipe wall extending from the outer pipe surface inward toward the inner pipe surface.

In small pipe (pipe having a diameter less than about 5') the steel reinforcing wires are small in diameter and strains on the concrete in the relatively thick wall are less. However, concrete pipe having an inside diameter ranging from about 5' or 6' under loads which may be moderate or even heavy (depending upon design specifications) will require reinforcing steel. Such reinforcing steel under tension and in the form of curved cages have large forces therein which are directed radially inwardly against the concrete. The increased magnitude of such forces coupled with proportionately less concrete for resisting such forces results in failure of the pipe wall wherein the inside concrete of the pipe in the plane of the inner cage is pulled off by the inside cage straightening out.

Concrete pipes are customarily laid in a flat bottom ditch which places a concentrated line load along the invert of the pipe. In addition, pipes are frequently required by specifications to be tested in three-edge bearings which in effect places a concentrated line load parallel to the axis of the pipe along the crown and invert. These concentrated loads create tension stresses in the concrete which cause cracks at approximately 45° to the radius of the pipe. These are known as diagonal tension cracks and start at the inside face of the pipe and extend outwardly and toward the crown and invert at 45° to the pipe radius.

Large pipes under even moderate loads fail under radial tension or diagonal tension as described above or a combination of both. The concentrated load limit for a pipe depends upon which type of failure occurs first, that due to radial tension or to diagonal tension. In a conventional pipe, both of these limits are determined by the tensile strength of the concrete which resists these forces to some degree. To increase the load capacity of the pipe requires engineering techniques to provide additional resistance to these forces. One such technique is to provide steel reinforcing across the planes where potential radial or diagonal tension cracks may occur and thereby increase the pipe strength. Such additional reinforcing in the past has been costly in materials and labor.

The present invention provides a pipe structure whose manufacture is simple and expeditious and whose steel is used so efficiently that a pipe having excellent load resisting characteristics and minimum steel may be fabricated. The invention makes it possible to handle inner and outer cages independently and permits final positioning of an inner and outer cage without danger of cage distortion or shifting.

The invention generally contemplates the provision of sinuous steel stirrups extending radially from the inner cage coils toward the outer cage coils, and almost reaching the outer cage, each stirrup extending longitudinally of the pipe and securely attached only to the inner cage. In addition, the stirrups are disposed only at limited angular regions at the crown and invert. Additional stirrups may be provided attached to the outer cage and extending radially toward but stopping short of the inner cage. Such additional stirrups, when provided, are interspersed with the principal stirrups. It has been found that inner and outer cage structures may be pre-fabricated and then finally positioned for pipe manufacture in a simple manner.

The invention will now be described in connection with drawings wherein FIG. 1 is an elevation of a finished pipe embodying the present invention, some of the concrete being broken away for purposes of illustration.

FIG. 2 is a section on line 2—2 of FIG. 1.
FIG. 3 is a sectional detail on line 3—3 of FIG. 2.
FIG. 4 is a section on line 4—4 of FIG. 3.
FIG. 5 is a transverse section of a modified form of pipe.
FIG. 6 is an enlarged detail of an arcuate portion of the modified form of pipe.
FIGS. 7 and 8 are respectively sections on lines 7 and 8 of FIG. 6.

Referring first to FIGS. 1 to 4 inclusive, concrete pipe 10 embodying the invention has inner and outer walls 11 and 12 respectively. Pipe 10 which may have a length generally of the order of 6 to 8 feet, or even less in larger diameters, will have an inside diameter of at least about 48" and more often have a diameter of from about 72" and up. With increasing pipe diameter, the greater become the advantages of the invention. The wall thickness between surfaces 11 and 12 will be at least 5" and will more likely range from about 6" or 7" up to as much as 12" and even more.

Pipe 10 has inner cage 14 and outer cage 15. Each cage may have a continuous helix or separate circular coils 14a and 15a respectively. Adjacent coils of a cage are retained in fixed relative position by longitudinal steel rods 16 and 17 for inner and outer cages respectively. The gauge of wire for the coils and rods of each cage and spacing between coils and rods will be determined by the load requirements for a pipe. Inasmuch as the same diameter pipe may be manufactured for different loads, it is possible for pipes having the same inside (or outside) diameters to have inner and outer cages of different gauges of steel and have the coils at different distances from each other and have the longitudinal rods 16 and 17 also at different distances from each other. The number of cage coils per foot length of pipe and the number and spacing of longitudinal rods (amount of steel) will depend upon design objectives.

In general, even with the invention herein disclosed, conventional engineering procedure can be used for determining the stresses to be encountered in the pipe and the amount of steel required. It is understood that each cage 14 and 15 will have the rods and coils welded together to form a conventional cage structure. In accordance with general practice, the inner and outer cages will be located substantially one inch from the inside and outside pipe walls. In some instances the spacing between a cage and adjacent pipe wall may be increased to about 1½".

In accordance with the present invention, stirrups generally indicated by 24 are provided. As indicated in FIG. 2, the angle subtended from pipe axis O by each group of stirrups will be between about 60 and about 70 degrees for both the crown or top portion of the pipe and the invert or bottom portion of the pipe. In some instances, the angle subtended by each group of stirrups may depart somewhat from this range but, in general, best results are obtained within this general range.

Stirrups 24 are disposed at spaced intervals in two groups at the top and bottom portions of the pipe. In general, stirrups 25a and 25b can be disposed at the crown and invert generally along the vertical diameter of the pipe when laid. A departure from precise alignment can be as much as about ½". The disposition of stirrups along the vertical axis of the pipe is not essential. Additional stirrups 26a to 26e inclusive are to one side of stirrup 25a and corresponding stirrups 27a to 27e are to one side of stirrup 25b at the bottom portion of the pipe. To the other side of each of the center stirrups 25a and 25b, there are stirrups 28a to 28e inclusive at the top and 29a to 29e inclusive for the bottom of the pipe.

The number and spacing of additional stirrups in the 26, 27, 28 and 29 series will depend upon the design characteristics of the pipe and, like the cages, will be so selected as to meet certain load requirements. The number of stirrups per group may vary according to design requirements and the number shown here is by way of example only. It has been determined that adjacent stirrups in a group may have a space between them of about three-fourths of the difference between the pipe wall thickness and 1.5 all in inches. Thus for a 7" pipe wall, the spacing between stirrups will be 7 less 1.5 times ¾, amounting to ¾ of 5.5 inches or about 4.2 inches. This spacing arrangement provides the most efficient use of steel and generally prevents cracks from appearing between stirrups.

Referring now to FIGS. 3 and 4, a stirrup generally indicated by 24 consists of a sinuous length of steel rod having generally straight portions 35a, 35b, 35c, etc. interconnected by bights or loops 36a, 36b, 36c, etc. at one tangent line and loops 37a, 37b, 37c, etc. at the other tangent line. Stirrup 24 has the 36 series of loops threaded about adjacent coils 14a of inner cage 14. Each stirrup loop enfolds a cage coil. While a stirrup loop may be welded to each cage coil enfolded, it is possible to skip welding at every cage coil and make the welds about every 12" or 16" along the length of the cage. Thus a cage having a length of say 6' can have the stirrups welded at each cage end and have about four welds at spaced intervals where cage coils are present. No great precision is necessary since it is only necessary to insure proper stirrup orientation. The maximum spacing of about 16" is not absolute and will depend upon when a cage coil is encountered. Thus about 16" may permit a variation of several inches and will depend upon stirrup stiffness, spacing between adjacent cage coils. Closer weld spacing may be provided in doubtful cases. It is important that the stirrups be welded to the cage and that each stirrup sinuosity (comprising two straight parts and connecting loop) extend substantially radially from the inner cage toward the outer cage with the entire stirrup extending longitudinally of the inner cage.

The radial length of a stirrup sinuosity is such that free loops in the 37 series terminate as closely as possible to the cylindrical plane defined by outer cage 15. The distance between the very ends of the 37 series of free loops in the stirrups and the outer cage plane is such that an inner cage provided with the welded stirrups must be capable of being telescoped into position within the outer cage without interference between the two cage systems. It has been found that a clearance of the order of about ¼" between the free loop ends of a stirrup and the plane defined by the adjacent outer cage will suffice.

It is not necessary that the free stirrup loops in the 37 series have any radial alignment with coils 15a of the outer cage. In fact, each stirrup need only extend radially outwardly as viewed along the pipe axis. While it is preferred to have the loops of a stirrup extend normal to the pipe axis as viewed in FIG. 1 for example, some departure from this can be tolerated wherein a stirrup loop may tilt toward one pipe end or the other. No attempt has been made to show accurate proportions in the drawings since this is impractical.

The gauge of metal used for the stirrups will also depend upon the amount of reinforcement required. It is evident from the configuration of the stirrups that such stirrups may be pre-fabricated in indefinite length and are easily disposed in position on an inner cage. The stirrups and inner cage may be welded together by simply holding the stirrup against the cage and welding.

The inner and outer cages after being telescoped over each other can be handled in conventional fashion insofar as casting a pipe is concerned. The stirrups do not interfere with the distribution of the concrete about the cages and stirrups when they are disposed within a casting form. When casting pipe with inner and outer cages but without the use of stirrups, it is customary to clamp or rigidly tie the cages with respect to each other so that the generally concentric relationship of the two cages and the walls of the casting form are preserved. The same procedure can be followed with the new pipe.

It has been found that having the free un-anchored ends of the inner cage loops of the stirrups, extending almost to the plane of the outer cage, provides unexpected and decided advantages. Conventional engineering theory and practice would support a conclusion that having stirrups from the inner cage extending toward but stopping short of the outer cage is worthless. Surprisingly, the stirrups provide so much reinforcement that the amount of steel used in both inner and outer cages exclusive of stirrups may be reduced substantially as compared to a conventional pipe having only inner and outer cages with no stirrups. This is because a pipe embodying the present invention more fully utilizes the steel reinforcement insofar as tension is concerned than is true of conventional pipe having cages minus stirrups.

Because of the above characteristic, it is possible to reduce the amount of steel necessary for desired reinforcement and use smaller gauge wire. This further improves matters due to stronger bonding to concrete. A pipe embodying the present invention makes it possible to effect a reduction in steel of from 25% to 50% over a pipe designed for similar purposes but having inner and outer cages without stirrups. The increased cost of fabrication of the new pipe involved in welding stirrups to a cage is negligible in comparison to other costs.

A pipe embodying the present invention designed for a certain load will generally have an ultimate load strength of at least about 30% higher than the same pipe designed for the same load with cages but minus stirrups. In some tests on pipe embodying the invention, inside cage coils were caused to break in tension, the stirrups and outer cage coils remaining intact. Such failure is generally rare in conventional pipe having cages minus stirrups.

Insofar as the design of a pipe embodying the present invention is concerned, the same general engineering approach may be used as in conventional pipe. As is usual in this art, a preliminary design of a pipe is checked by tests. Once some simple tests have been run on one or two pipe sizes, the designs for pipes generally may be readily worked out.

Referring now to FIGS. 5 to 8 inclusive, a modification is illustrated wherein outer cage 15' is provided with a number of inwardly extending stirrups 24'. Stirrups 24' are similar to outwardly extending stirrups 24 but have one series of loops disposed about and welded to the coils of the outer cage. Stirrups 24' extend radially toward the inner cage and stop short from the plane of the inner cage. It is preferred to have those stirrups along the vertical axis, indicated by 25a and 25b in FIG. 5, be outwardly extending as in FIG. 2 so that these stirrups are welded to and extend from the inner cage toward the outer cage and stop short thereof. Stirrups 24' welded to and extending from the outer cage toward the inner cage in FIG. 5, are disposed at spaced intervals dictated by engineering considerations and will generally be disposed between outwardly extending stirrups. As with the stirrups in FIGS. 1 to 4 inclusive, stirrups 24' need not be welded to each outer cage coil enfolded by a stirrup loop. The same spacing technique can be used as with stirrups 24. As shown in FIG. 5, outer cage stirrups 24' will be separated by at least one inner cage stirrup 24. There can be a number of inner cage stirrups 24 extending outwardly toward the outer cage adjacent each other. As a rule, however, the number of outer cage supported stirrups 24' will be dictated by engineering considerations and will supplement the inner cage supported stirrups. While a pipe can have a series of stirrups extending only from the inner cage toward but short of the outer cage as illustrated in FIGS. 1 to 4 inclusive, no pipe embodying the invention will have stirrups extending only from the outer cage toward the inner cage without also including the inner cage stirrups as illustrated in FIG. 5, for example.

The clearance between the free unsupported loop ends of stirrups 24' and the plane of opposing inner cage is not as critical as where the stirrups extend from the inner cage toward the outer cage. It has been found, for example, that a larger clearance for loop ends of stirrups 24' can be tolerated without substantial loss of strength. Thus a clearance of between about ½" and about 1" between the free unsupported ends of the loops of stirrups 24' can be tolerated. However, from a practical standpoint both stirrups 24 and 24' may be the same size and length. By having such increased clearance, telescoping of inner and outer cage assemblies can be accomplished with the same ease as with the pipe illustrated in FIGS. 1 to 4 inclusive. It is understood, of course, that the two cage assemblies in the modified form where each cage has stirrups requires rotational orientation so that the stirrups of the outer cage are disposed in proper relative position with respect to stirrups of the inner cage. In all instances the cages and stirrups should bond to the concrete.

The modification illustrated in FIGS. 5 to 8 inclusive is particularly advantageous to avoid concrete failure at the crown and invert regions near the outer cages. By having a small number of outer cage stirrups as hereinbefore disclosed, the reinforcement for the outer portions of the pipe at the crown and invert regions is substantially improved. A generally similar improvement in reinforcement obtained by the outer cage support stirrups may be obtained by increasing the number of inner cage stirrups so that the modification supplements the design flexibility of the form of the invention illustrated in FIGS. 1 to 4 inclusive.

As a rule, a pipe will be provided with some particular indication to show the location of the center stirrups for the top group of stirrups and/or the bottom group of stirrups. This may be in the form of a lifting hole or other identifying means extending from the pipe wall either outwardly to the outer surface or inwardly to the inner surface. This will promote easy orientation of a pipe during laying.

What is claimed is:

1. A concrete pipe having a substantially uniform wall thickness of at least about 5" and having inner and outer cylindrical surfaces with an inside diameter of at least of the order of about 4', said pipe having steel reinforcement in the form of concentric inner and outer cylindrical cages disposed respectively within the concrete adjacent the inner and outer pipe surfaces, said cages being co-axial with said pipe and having generally circular coils spaced longitudinally along the pipe, and additional steel reinforcement for the length of said pipe at two limited arcuate portions of the pipe, said two arcuate portions being respectively at the crown and invert of said pipe when lying horizontal, said additional reinforcement being wholly within the pipe wall and bonded to the concrete and comprising a number of separate steel stirrups at each arcuate region, each stirrup being sinuous and, as viewed along a line normal to the pipe axis, extending longitudinally of the pipe with the sinuosity extending from the inner cage radially of the pipe toward the outer cage, each stirrup having each coil of the inner cage enfolded thereby, each stirrup being welded to at least certain cage coils so that welds along one stirrup are no more than about 16" from each other as measured along the pipe length, the stirrup loops stopping short of the outer cage cylinder by a distance of about ¼", said stirrups being disposed at angularly spaced intervals along said limited arcuate portions of said pipe and each arcuate portion subtending an angle of between about 60° and about 70°, the construction permitting said cages to be telescoped, adjusted and locked in desired relative positions prior to casting, said construction providing a reinforcement which is highly efficient for maximum strength with minimum steel reinforcement.

2. The construction according to claim wherein the spacing between adjacent stirrups is three-fourths of the figure obtained by subtracting 1.5 from the thickness of the pipe wall in inches.

3. The construction according to claim 1 wherein said outer cage has a plurality of stirrups, said outer cage stirrups being welded to the outer cage coils at no more than about 16″ intervals as measured along the cage length and being positioned in a manner corresponding to the inner cage supported stirrups and substantially within the angle subtended by the inner cage stirrups, said outer cage stirrups extending radially inwardly toward but stopping short of the inner cage by a distance of about ½″, certain individual stirrups carried by one cage, alternating with certain individual stirrups carried by the other cage, whereby said inner and outer cages may continue to be handled independently but must be angularly oriented to insure desired positioning of the stirrups carried by the respective cages.

4. For use in the manufacture of concrete pipe, whose inside diameter is at least about 4′ with a wall thickness of at least about 5″, a generally cylindrical steel cage having generally circular coils spaced longitudinally of the cage cylinder, and a plurality of steel stirrups disposed in two groups at diametrically opposed arcuate regions, defining the crown and invert regions of a finished pipe, each stirrup being sinuous and extending longitudinally of the cage cylinder, with the sinuosity extending radially outwardly of the cage, each stirrup having each coil of the cage enfolded thereby so that a stirrup loops about each cage coil with the stirrup length extending along the cage length, a stirrup being welded to the cage at regions spaced no more than about 16″ as measured along the length of a cage and each stirrup loop extending outwardly from the cage for a distance such that the cylindrical surface containing the loop ends has a radius which is no less than about ¼″ short of the radius of an outer steel cage to be used in making a concrete pipe, said stirrups having their surfaces adapted for bonding to concrete throughout the length of each stirrup, and the stirrup groups each subtending a cylinder angle in the range of about 60° to about 70°.

5. For use in the manufacture of concrete pipe, whose inside diameter is at least about 4′ with a wall thickness of at least about 5″, a generally cylindrical steel cage having generally circular coils spaced longitudinally of the cage cylinder, and a plurality of steel stirrups disposed in two groups at diametrically opposed arcuate regions, defining the crown and invert regions of a finished pipe, each stirrup being sinuous and extending longitudinally of the cage cylinder, with the sinuosity extending radially inwardly of the cage, each stirrup having each coil of the cage enfolded thereby and being welded to certain cage coils spaced no more than about 16″ so that a stirrup loops about each cage with the stirrup length extending along the cage length and each stirrup loop extending inwardly from the cage for a distance such that the cylindrical surface containing the free loop ends has a radius which is no more than about ½″ short of the radius of an inner steel cage to be used in making concrete pipe, said stirrups having their surfaces adapted for bonding to concrete throughout the length of each stirrup, said stirrups extending inwardly and the stirrup groups each subtending a cylinder angle less than 70°, said cage being useful with a cage according to claim 4.

References Cited

UNITED STATES PATENTS

| | | | |
|---|---|---|---|
| 912,318 | 2/1909 | McMahon | 138—175 XR |
| 2,717,615 | 9/1955 | Peckworth | 138—175 |

SAMUEL ROTHBERG, *Primary Examiner.*

BRADFORD KILE, *Assistant Examiner.*